(12) United States Patent  
Yamashita (10) Patent No.: US 8,576,185 B2  
(45) Date of Patent: Nov. 5, 2013

(54) DISPLAY DEVICE

(75) Inventor: Reiko Yamashita, Gifu (JP)

(73) Assignee: KYOCERA Corporation, Kyoto (JP)

( * ) Notice: Subject to any disclaimer, the term of this patent is extended or adjusted under 35 U.S.C. 154(b) by 442 days.

(21) Appl. No.: 12/891,628

(22) Filed: Sep. 27, 2010

(65) Prior Publication Data

US 2011/0074717 A1    Mar. 31, 2011

(30) Foreign Application Priority Data

Sep. 28, 2009   (JP) ................. 2009-222010

(51) Int. Cl.
*G06F 3/041* (2006.01)

(52) U.S. Cl.
USPC ............ 345/173; 345/1.1; 345/174; 345/902; 345/903; 715/810

(58) Field of Classification Search
USPC ............... 345/173–178, 1.1–1.3, 902, 903; 178/18.01–19.04; 715/810
See application file for complete search history.

(56) References Cited

U.S. PATENT DOCUMENTS

| 5,585,821 A | 12/1996 | Ishikura et al. | |
| 7,705,799 B2 * | 4/2010 | Niwa | 345/1.1 |
| 8,120,596 B2 * | 2/2012 | Popovich et al. | 345/178 |
| 2005/0264540 A1 * | 12/2005 | Niwa | 345/173 |
| 2005/0270278 A1 * | 12/2005 | Ouchi | 345/173 |
| 2007/0188450 A1 * | 8/2007 | Hernandez et al. | 345/158 |
| 2009/0164930 A1 * | 6/2009 | Chen et al. | 715/769 |
| 2010/0225601 A1 * | 9/2010 | Homma et al. | 345/173 |

FOREIGN PATENT DOCUMENTS

| JP | H06-274305 A | 9/1994 |
| JP | 2005-092476 | 4/2005 |
| JP | 2006-311224 | 11/2006 |

* cited by examiner

*Primary Examiner* — Lun-Yi Lao
*Assistant Examiner* — Sosina Abebe
(74) *Attorney, Agent, or Firm* — Procopio, Cory, Hargreaves & Savitch LLP (57) ABSTRACT

A display device is disclosed. The display device comprises a first touch panel comprising a first display module, a second touch panel comprising a second display module, and a contact detection module located between the first touch panel and the second touch panel. A control module performs display control of the first touch panel and the second touch panel based on operations of the first touch panel, the second touch panel, and the contact detection module.

10 Claims, 9 Drawing Sheets

| NEW e-mail creation | |
|---|---|
| TO | |
| Sub | |
| Attach-ment | C |
| <Body text> | |

DISPLAY DEVICE

CROSS-REFERENCE TO RELATED APPLICATION

The present application claims priority under 35 U.S.C. §119 to Japanese Patent Application No. 2009-222010, filed on Sep. 28, 2009, entitled "MOBILE TERMINAL DEVICE". The content of which is incorporated by reference herein in its entirety.

FIELD

Embodiments of the present disclosure relate generally to display devices, and more particularly relate to display devices comprising a plurality of touch screens.

BACKGROUND

In case a display device with two touch panels is used, it may be necessary to implement complicated displays in order to achieve complicated functions. For example, a display device with two touch panels may implement a complicated display related to one function that is implemented using two touch panels. For example, a drag operation across the two touch panels may be necessary. A technique is known for moving a displayed object, such as a window displayed on the first touch panel, from a first touch panel to a second touch panel. While touching a displayed object using a first hand, a desired position on the second touch panel is also touched using a second hand, and then the first hand is removed from the first touch panel. However, in case moving the displayed object from one touch panel to the other touch panel, there may be a risk of increasing an operational load on the user.

SUMMARY

A display device is disclosed. The display device comprises a first touch panel, a second touch panel, and a contact detection module located between the first touch panel and the second touch panel. A control module performs display control for at least one of the first touch panel and the second touch panel based on the operations of the first touch panel, the second touch panel, or the contact detector module.

In a first embodiment, a display device comprises a first touch panel comprising a first display module, a second touch panel comprising a second display module, a contact detection module, and a control module. The contact detection module is located between the first touch panel and the second touch panel. The control module performs display control of the first touch panel and second touch panel based on the operations of at least one of the first touch panel, the second touch panel, and the contact detection module.

In a second embodiment, a display method for a display device detects operations on a first touch panel, and a second touch panel, contact detection module located between the first touch panel and the second touch panel and. The method then performs display control for at least one of the first touch panel and second touch panel to position a displayed object based on the operations.

In a third embodiment, a computer readable medium comprises program code for displaying an object on touch panels. The program code further comprises code for detecting touch operations on a first touch panel, a second touch panel, and a contact detection module located between the first touch panel and the second touch panel. The program code further comprises code for determining performing display control for at least one of the first touch panel and second touch panel to position a displayed object, based on the touch operations.

BRIEF DESCRIPTION OF THE DRAWINGS

Embodiments of the present disclosure are hereinafter described in conjunction with the following figures, wherein like numerals denote like elements. The figures are provided for illustration and depict exemplary embodiments of the present disclosure. The figures are provided to facilitate understanding of the present disclosure without limiting the breadth, scope, scale, or applicability of the present disclosure. The drawings are not necessarily made to scale.

DETAILED DESCRIPTION

The following description is presented to enable a person of ordinary skill in the art to make and use the embodiments of the disclosure. The following detailed description is exemplary in nature and is not intended to limit the disclosure or the application and uses of the embodiments of the disclosure. Descriptions of specific devices, techniques, and applications are provided only as examples. Modifications to the examples described herein will be readily apparent to those of ordinary skill in the art, and the general principles defined herein may be applied to other examples and applications without departing from the spirit and scope of the disclosure. Furthermore, there is no intention to be bound by any expressed or implied theory presented in the preceding field, background, summary or the following detailed description. The present disclosure should be accorded scope consistent with the claims, and not limited to the examples described and shown herein.

Embodiments of the disclosure are described herein in the context of one practical non-limiting application, namely, a mobile phone. Embodiments of the disclosure, however, are not limited to such mobile phones, and the techniques described herein may also be utilized in other applications. For example, embodiments may be applicable to smart phones, information devices, digital books, digital cameras, electronic game machines, digital music players, personal digital assistance (PDA), personal handy phone system (PHS), lap top computers, and the like.

As would be apparent to one of ordinary skill in the art after reading this description, these are merely examples and the embodiments of the disclosure are not limited to operating in accordance with these examples. Other embodiments may be utilized and structural changes may be made without departing from the scope of the exemplary embodiments of the present disclosure.

Figure 1A:
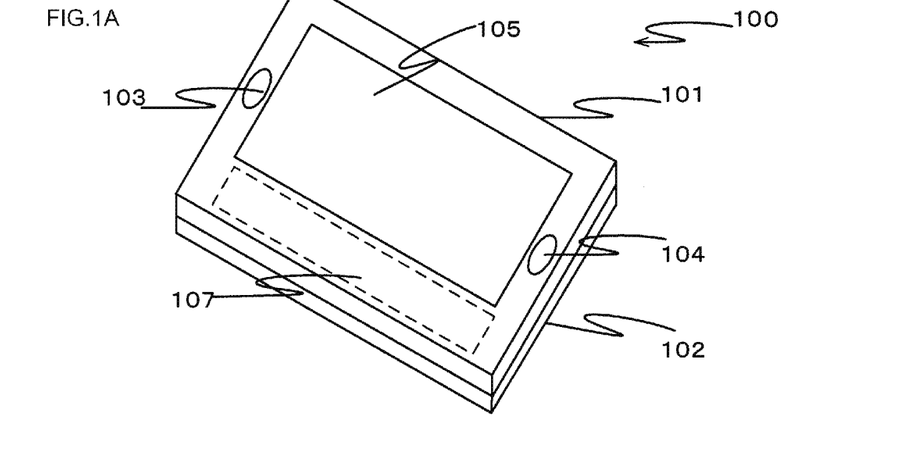
FIG. 1A-1B are illustrations of an external perspective view of a cell phone.
Figure 1B:
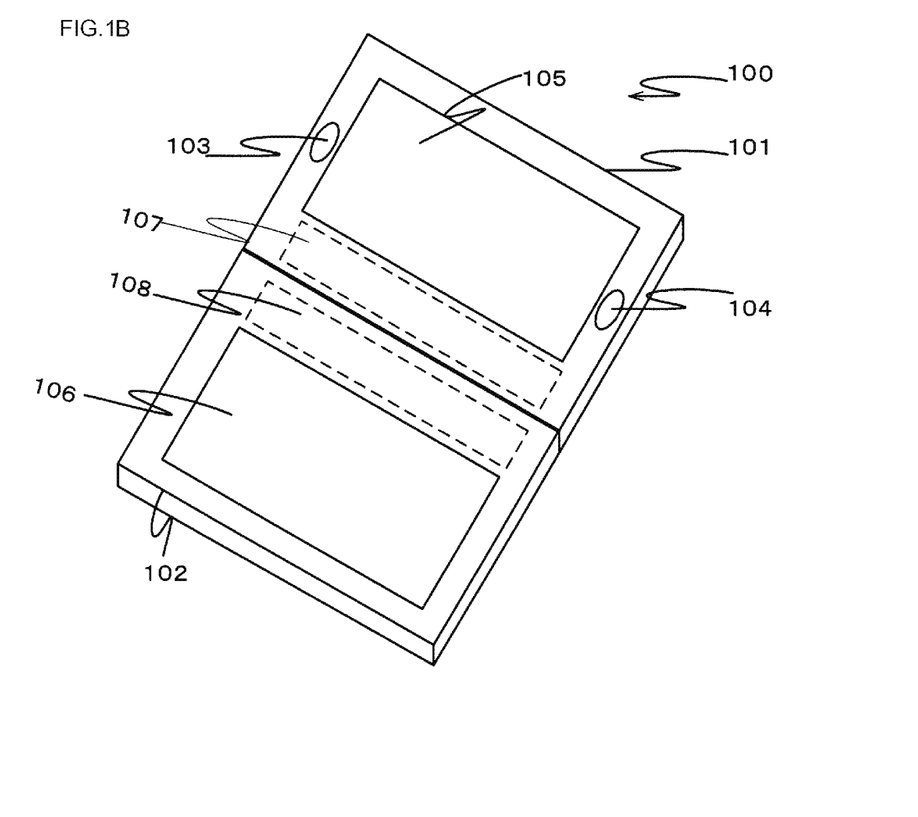

FIG. 1 is an illustration of an external perspective view of a sliding-type cell phone 100 showing a closed state and an open state thereof. The cell phone 100 comprises an upper housing 101 and a lower housing 102. The closed state refers to a state in which the upper housing 101 is in a relative position that covers the touch panel 106 of the lower housing 102. The upper housing 101 comprises a speaker 103, a microphone 104, a touch panel 105, and a touch sensor 107. The lower housing 102 comprises a touch panel 106 and a touch sensor 108. On each of the touch panels 105 and 106, key groups (not shown) such as cursor keys and numerical keys as well as icons and the like are located to input user instructions. For example, users can perform various operations by touching/activating these keys with their fingers. Moreover, the upper housing 101 and the lower housing 102 are coupled so that they can be opened or closed relative to each other.

In one embodiment, an icon displayed on one touch panel may be moved to the other touch panel in case the upper housing 101 and the lower housing 102 are in the open state. In another embodiment, an icon displayed on one touch panel may be moved to the other touch panel in case the upper housing 101 and the lower housing 102 are in the closed state.

FIG. 1A is an external perspective view of the upper housing 101 and the lower housing 102 in the closed state. FIG. 1B is an external perspective view of the upper housing 101 and the lower housing 102 in the open state. The open state refers to a state in which the touch panel 105 of the upper housing 101 and the touch panel 106 of the lower housing 102 are located side by side on a substantially similar plane. That is, the touch panel 105 and the touch panel 106 are exposed to outside and can be viewed from the same direction.

Figure 2A:
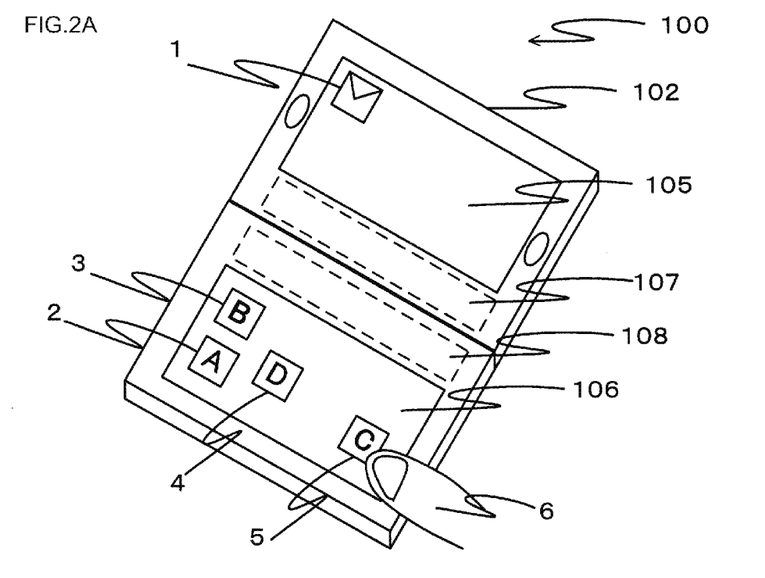
FIGS. 2A-2B are illustrations of an external perspective view of the cell phone shown in FIG. 1 showing an exemplary drag-and-drop operation across two touch panels thereon.

FIGS. 2A-2B are illustrations of an external perspective view of the cell phone 100 shown in FIGS. 1A-1B showing an exemplary drag-and-drop operation across two touch panels 105/106 thereon. FIG. 2A shows an example where icons 1 to 5 are displayed on the touch panels 105 and 106. FIG. 2A shows an example in which a user touches the icon 5 on the touch panel 106 with their finger 6 and while touching the icon 5, attempts to move (drag) the icon 5 without removing their finger 6 from the touch panel 106.

Figure 2B:
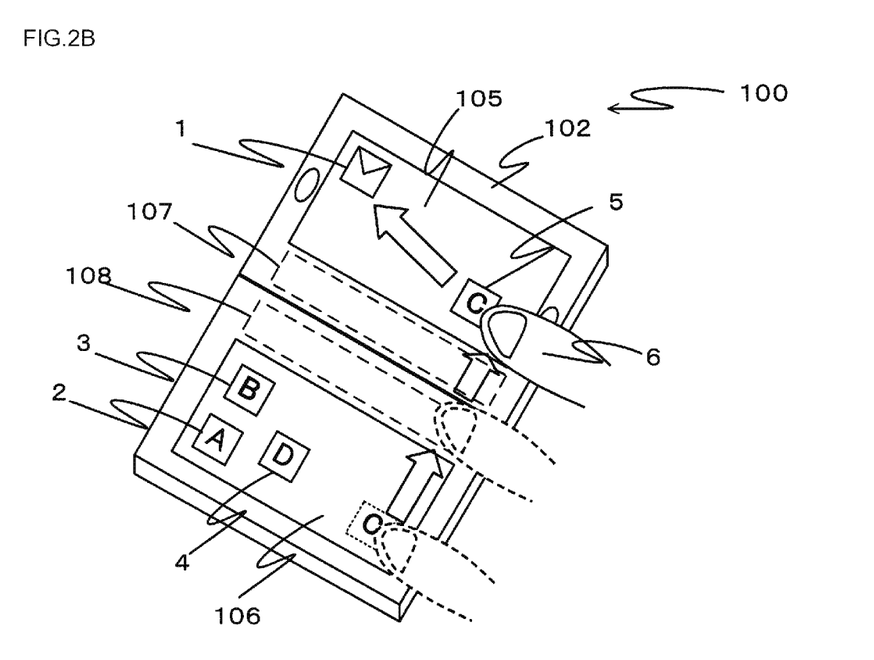

As the user drags the icon 5 towards the touch panel 105 without removing their finger 6 (touch) from the touch panel 106, the finger 6 enters an area of the touch panel 105 after passing through the touch sensor 108 and the touch sensor 107 (FIG. 2B). Even if the finger 6 leaves the touch panel 106, the touch on the icon 5 is not cancelled on a boundary of the touch panel 106 on a side of the touch panel 105.

Figure 3:
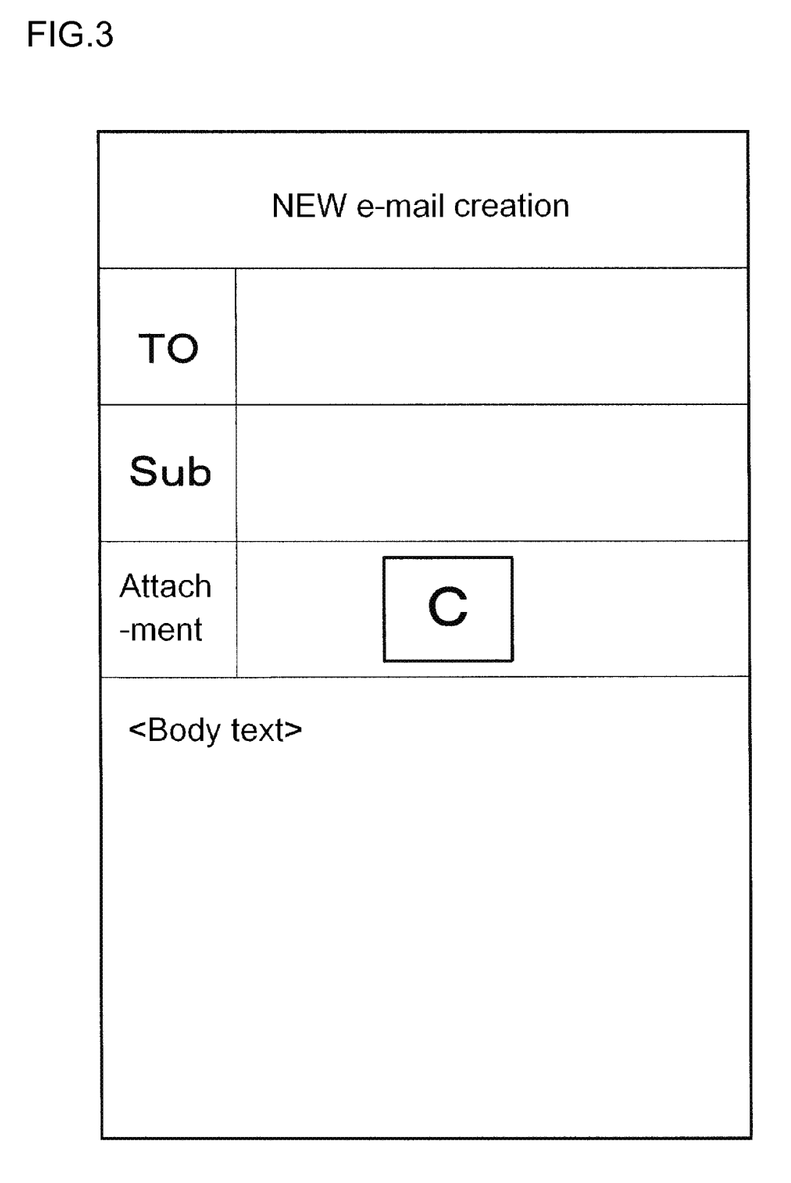
FIG. 3 is an illustration of an E-mail creation screen.

If the user slides the finger 6 on the touch panel 105 and drops the icon 5 on an E-mail icon 1 by removing the finger 6 from the touch panel 105, a creation screen is displayed for a new E-mail with an attached file corresponding to the dropped icon 5 as shown in FIG. 3. Removing the finger 6 from the touch panel 105 after the finger 6 slides over the touch panel 105 and reaches a position of the icon 1, removes a pressure applied by the finger 6 on the touch panel 105, thereby cancelling the application of pressure on the touch panel 105. In this manner, even with two touch panels located apart from each other, the user can perform a drag-and-drop operation in a same way she/he would in a single display.

Figure 4:
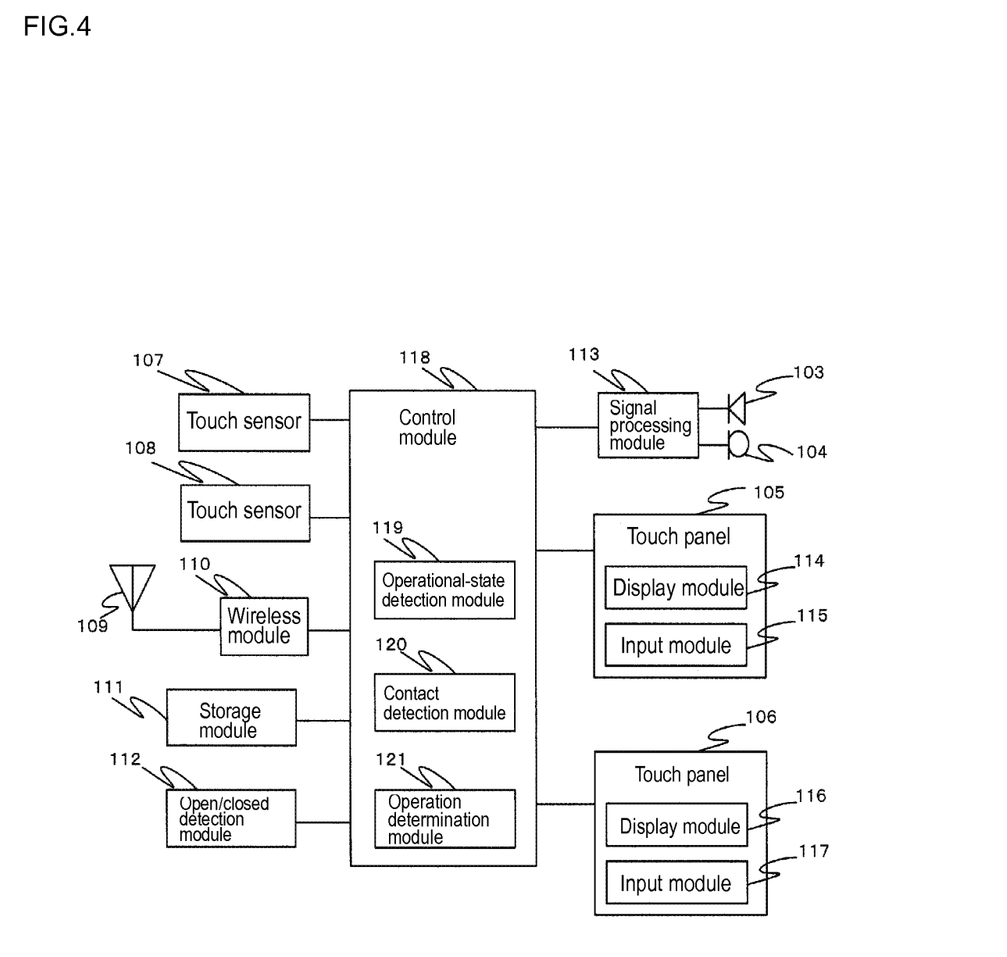
FIG. 4 is an illustration of a functional block diagram of a cell phone according to an embodiment of the disclosure.

FIG. 4 is an illustration of a functional block diagram of a mobile phone 100 (system 100) according to an embodiment of the disclosure. The mobile phone 100 may comprise, for example but without limitation, a cell phone, a PDA, and the like. Hereinafter, the mobile phone 100 is described as a cell phone. The cell phone 100 comprises an antenna 109, a wireless module 110, a microphone 104, a speaker 103, a signal-processing module 113, an open/closed detection module 112, a touch panel 105, a touch panel 106, a touch sensor 107, a touch sensor 108, a storage module 111, and a control module 118.

A practical system 100 may comprise any number of input modules, any number of control modules, any number of storage modules, any number of touch panels, and any number of display modules. The illustrated system 100 depicts a simple embodiment for ease of description. These and other elements of the system 100 are interconnected together, allowing communication between the various elements of system 100. In one embodiment, these and other elements of the system 100 may be interconnected together via a communication link (not shown). Those of skill in the art will understand that the various illustrative blocks, modules, circuits, and processing logic described in connection with the embodiments disclosed herein may be implemented in hardware, computer-readable software, firmware, or any practical combination thereof. To illustrate clearly this interchangeability and compatibility of hardware, firmware, and software, various illustrative components, blocks, modules, circuits, and steps are described generally in terms of their functionality. Whether such functionality is implemented as hardware, firmware, or software depends upon the particular application and design constraints imposed on the overall system. Those familiar with the concepts described herein may implement such functionality in a suitable manner for each particular application, but such implementation decisions should not be interpreted as causing a departure from the scope of the present disclosure.

The antenna 109 is configured to transmit and receive electromagnetic waves at a predetermined frequency band to and from, for example, a base station (not shown). The antenna 109 may comprise a single antenna or multiple antennas. The antenna 109 may be, for example but without limitation, a built-in antenna, a rod antenna, and the like.

The wireless module 110 is operable to transmit and receive a plurality of communication signals comprising data signals via the base station. The wireless module 110 communicates with the wireless network via a wireless data communication link (not shown). The wireless module 110 cooperates with the base station transceiver (not shown) with a suitably configured RF antenna arrangement such as the antenna 109 that can support a particular wireless communication protocol and modulation/demodulation scheme to transmit and receive data signals. The data signals may comprise, for example but without limitation, voice data during voice communication, text data during email, web data during accessing web site, and the like.

The signal-processing module 113 performs signal processing for sending audio signals input from the microphone 104 via the wireless module 110 and signal processing for outputting audio signals received via the wireless module 110 from the antenna 109 to the speaker 103. The signal-processing module 113 outputs an encoded digital voice for input to the control module 118, by converting an analog voice input received by the microphone 104 from outside. In this manner, the signal-processing module 113 amplifies the analog voice input from the microphone 104, and carries out an analog/digital conversion to obtain a digital voice input. The signal-processing module 113 applies a signal processing such as an encoding, or the like, to the digital voice input to obtain an encoded digital voice input, and sends the encoded digital voice input to the control module 118. The signal-processing module 113 outputs a digital voice data supplied from the control module 118. The signal-processing module 113 applies a signal processing to the digital voice data supplied from the control module 118. In this manner, the signal-processing module 113 performs decoding, digital/analog conversion, and amplification to convert the digital voice data to an analog voice signal for output to the speaker 103.

The microphone 104 outputs analog voice input received from outside to the signal-processing module 113 as an audio signal.

The speaker 103 outputs the audio signal processed by the signal-processing module 113 or audio data received from the control module 118 as audio.

The touch panel 105 comprises a display module 114 and an input module 115, and the touch panel 106 comprises a display module 116 and an input module 117. Each of the display modules 114 and 116 comprise an LCD Liquid Crystal Display (LCD) and has a function to display images such as characters and icons on the LCD based on instructions from the control module 118. The display modules 114 and 116 may accept a user input operation to input and transmit data, and input operation commands for functions provided in the system 100. The display modules 114 and 116 accept the operation command, and outputs operation command information to the control module 118 in response to the accepted operation command. The display modules 114 and 116 may be formed by, for example but without limitation, an organic electro-luminescence (OEL) panel, liquid crystal panel (LCD), and the like. Various kinds of information can be displayed on the display modules 114 and 116 via an image/video signal supplied from the control module 118. In addition, each of the display modules 114 and 116 has a function to display a tracing of the user's finger traced during a period from a touched state to the de-touched state based on coordinate values stored in the storage module 111 as described below.

Each of the input modules 115 and 117 detects instances of touch or pressure, which are examples of operations by the user, and while detecting such operations, outputs the coordinate values of the touched position to the storage module 111 via the control module 118 per unit time (for example, 1/60 second). Here, each of the input modules 115 and 117 may be realized by any device used for general touch panels, such as resistive touch panels, optical panels, capacitive touch panels, and the like.

The touch sensor 107 is located on a surface of or within the upper housing 101, and detects instances of operations by the user, such as touch or pressure. While detecting the instances, the touch sensor 107, outputs the coordinate values of a position of the touch or pressure per unit time (i.e., 1/60 second) to the storage module 111 via the control module 118. The touch sensor 107 may be any device used for general touch panels, such as resistive touch panels, optical panels, capacitive touch panels, and the like.

The touch sensor 108 is located on a surface of or within the upper housing 102, and detects instances of operations by the user, such as touch or pressure. While detecting the instances, the touch sensor 108, outputs the coordinate values of a position of the touch or pressure per unit time (i.e., 1/60 second) to the storage module 111 via the control module 118. The touch sensor 108 may be any device used for general touch panels, such as resistive touch panels, optical panels, capacitive touch panels, and the like.

The storage module 111 may be any suitable data storage area with suitable amount of memory that is formatted to support the operation of the system 100. Storage module 111 is configured to store, maintain, and provide data as needed to support the functionality of the system 100 in the manner described below. In practical embodiments, the storage module 111 may comprise, for example but without limitation, a non-volatile storage device (non-volatile semiconductor memory, hard disk device, optical disk device, and the like), a random access storage device (for example, SRAM, DRAM), HDD, Erasable Programmable Read Only Memory, or any other form of storage medium known in the art. The storage module 111 may be coupled to the control module 118 and configured to store, for example but without limitation, the input parameter values and the output parameter values corresponding to the a risk assessment scenario.

The storage module 111 may store, for example but without limitation, input from a user to the system 100. In one embodiment, the storage module 111 stores a position of the touch in substantially real time. For example, the storage module 111 stores coordinate values output from each of the input modules 115 and 117 as well as each of the touch sensors 107 and 108 per unit time (i.e., 1/60 second). In this manner, the storage module 111 stores the coordinate values output during the period from the touched state to the de-touched state. Upon switching from the touched state to the de-touched state, the storage module 111 outputs the stored coordinate values to the control module 118. The storage module 111 may also store, a computer program that is executed by the control module 118, an operating system, an application program, tentative data used in executing a program processing, and the like. The storage module 111 may be coupled to the control module 118 such that the control module 118 can read information from and write information to storage module 111. As an example, the control module 118 and storage module 111 may reside in their respective ASICs. The storage module 111 may also be integrated into the control module 118. In an embodiment, the storage module 111 may comprise a cache memory for storing temporary variables or other intermediate information during execution of instructions to be executed by the control module 118.

The control module 118 comprises an operational-state detection module 119, a contact detection module 120, and an operation determination module 121 and controls the overall operation of the cell phone 100. The control module 118 is configured to support functions of the cell phone 100. For example, the control module 118 may control operations of the system 100 so that processes of the system 100 are suitably performed. These processes may comprise, for example but without limitation, control of input/output signals to/from the touch sensors 107/108, performing control to display objects on the display modules 114/116, determining touch and de-touch state, and the like. In this manner, the control module 118 performs display control, allowing a drag-and-drop operation on two touch panels 105/106 as if the drag-and-drop operation is performed on a single display as explained in more detail below.

The control module 118 also accesses the storage module 111 such as access to the tracing of the coordinates of the touch. The control module 118, may be implemented or realized with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration. In practice, the control module 118 comprises processing logic that is configured to carry out the functions, techniques, and processing tasks associated with the operation of system 100. In particular, the processing logic is configured to support display operation described herein.

In one embodiment, the control module 118 may be configured to control the activation and deactivation of each of the touch sensors 107 and 108. For example, the control module 118 may be configured to activate the touch sensor 108 in case a touch by the user's finger is detected on the touch panel 106 and to activate the touch sensor 107 in case a touch by the user's finger is detected on the touch sensor 108. By performing such processing using the control module 118, the power consumed by the two touch sensors can be reduced.

The operational-state detection module 119 is configured to detect the operational state of each of the touch panels 105 and 106 according to the coordinate values delivered from each of the input modules 115 and 117. The operational state of the touch panels 105 and 106 comprises the touched state, in which the user's finger or the like has touched the touch panel (application of pressure on the touch panel has started), as well as the de-touched state, in which the use's finger or the like is removed from the touch panel (the pressure on the touch panel is cancelled), and the dragging state, in which the touched state is reached but the de-touched state is not yet reached. The dragging state generally means that the touched position is moved, but in this embodiment, cases in which the touched position is not moved at all are also included. The operational-state detection module 119 outputs the detected operational state to the operation determination module 121.

The contact detection module 120 is operable to detect, whether the user's finger or the like is touching the touch sensors 107 and 108 based on the results output from each of the touch sensors 107 and 108. The contact detection module 120 outputs the detected results to the operation determination module 121.

The operation determination module 121 is operable to determine, in case the operational-state detection module 119 detects the de-touched state in the touch panel 106, whether the dragging state should be continued based on the results output from the contact detection module 120. Specific methods of determination used by the operation determination module 121 is described below in more detailed below. If the operational-state detection module 119 detects the de-touched state on the touch panel 106, in case, for example, contact with the touch sensor 108 is detected, by the contact detection module 120, within a given time period after the detection of the de-touched state, the operation determination module 121 continues the dragging state. Next, if touch on the touch sensor 108 is no longer detected while the dragging state is continued, in case, for example, contact with the touch sensor 107 is detected by the contact detection module 120 within a given time period after the contact is no longer detected, the dragging state is continued. Moreover, if touch on the touch sensor 107 is no longer detected while the dragging state is continued, in case, for example, the touched state is detected in the touch panel 105 by the operational-state determination module 119 within a given time period after the contact is no longer detected, the operation determination module 121 continues the dragging state.

As explained above, the operation determination module 121 is configured to continue the touched state (or dragging state) in case a touch on the touch sensor 108 is detected by the contact detection module 120 within a given time period after the operational-state detection module 119 has detected the de-touched state on the touch panel 106. However, the detection of the touch on the touch sensor 108 by the contact detection module 120 need not be performed within a given time period after the operational-state detection module 119 has detected the de-touched state on the touch panel 106.

In one embodiment, the operation determination module 121 is configured to continue the touched state (or dragging state) in case a touch on the touch sensor 107 is detected by the contact detection module 120 within a given time period after the touch to the touch sensor 108 is no longer detected while the touched state (or dragging state) is continued. However, the detection of a touch on the touch sensor 107 by the contact detection module 120 need not be performed within a given time period after the touch on the touch sensor 108 is no longer detected.

In one embodiment, the operation determination module 121 is configured to continue the touched state (or dragging state) in case the touch on the touch panel 105 is detected by the operational-state determining module 119 within a given time period after the touch on the touch sensor 107 is no longer detected while the touched state (or dragging state) is continued. However, the detection of a touch on the touch panel 105 by the operational-state determining module 119 need not be performed within a given time period after the touch on the touch sensor 107 is no longer detected.

The open/closed detection module 112 is operable to detect the relative position of the upper housing 101 relative to the lower housing 102. Specifically, the open/closed detection module 112 detects whether the upper housing 101 and the lower housing 102 are in an open state or closed state. The open/closed detection module 112 outputs the detected results to the control module 118. For example, magnetic sensors can be located in the upper housing 101 and the lower housing 102. By the magnetic sensors, a configuration may be provided in which an electrical signal flows in the closed state in which the magnetic sensors come close to each other. An electric signal does not flow in the open state because the magnetic sensors are separated from each other.

Figure 5:
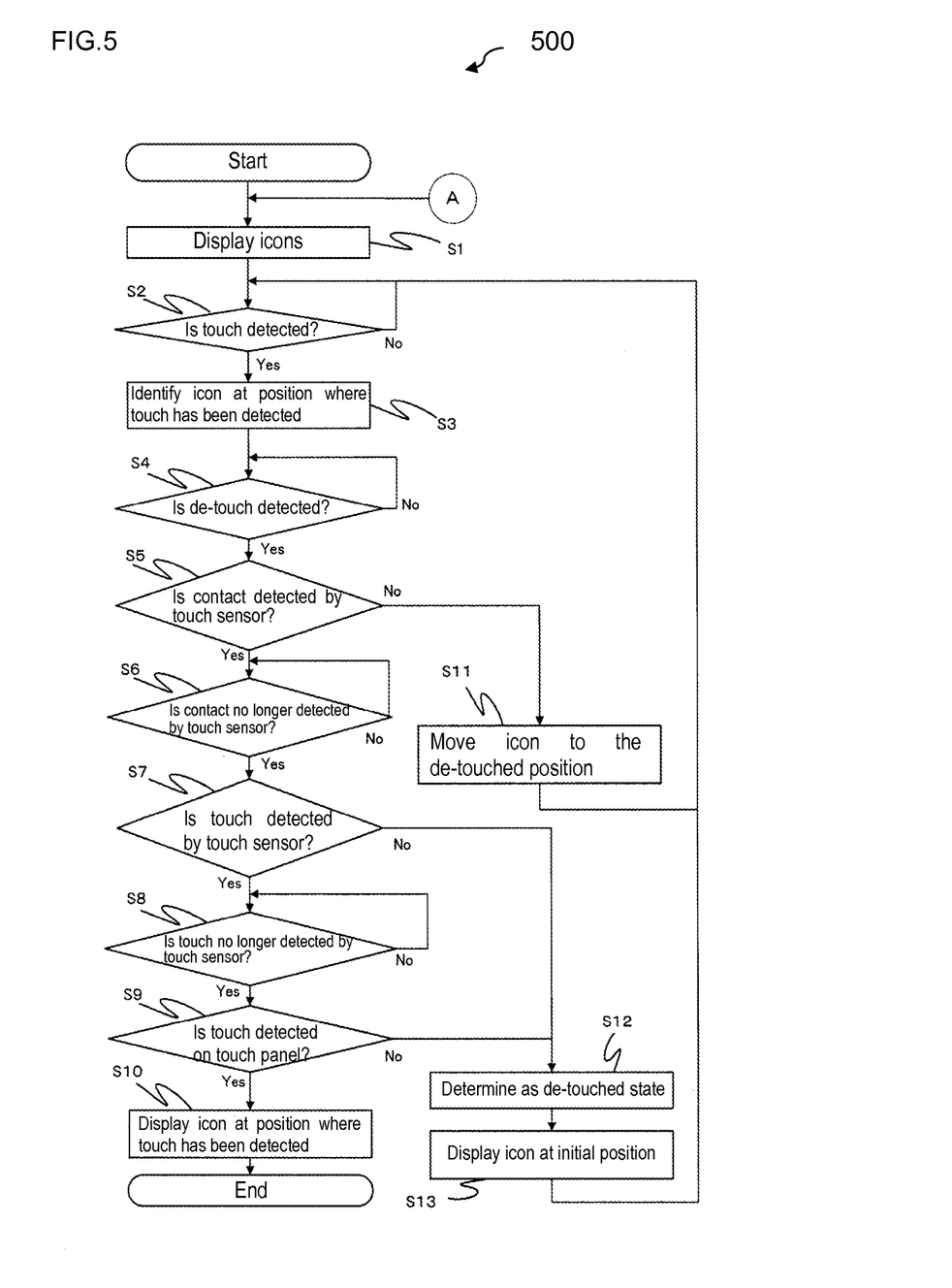
FIG. 5 is an illustration of an exemplary flowchart showing a drag-and-drop control process according to an embodiment of the disclosure.
Figure 6A:
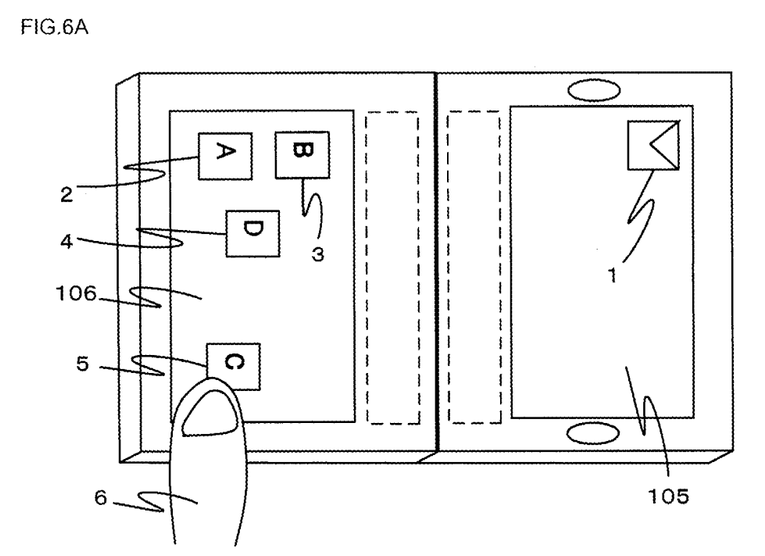
FIGS. 6A-6B are illustrations of an exemplary transition of a drag-and-drop control process according to an embodiment of the disclosure.
Figure 6B:
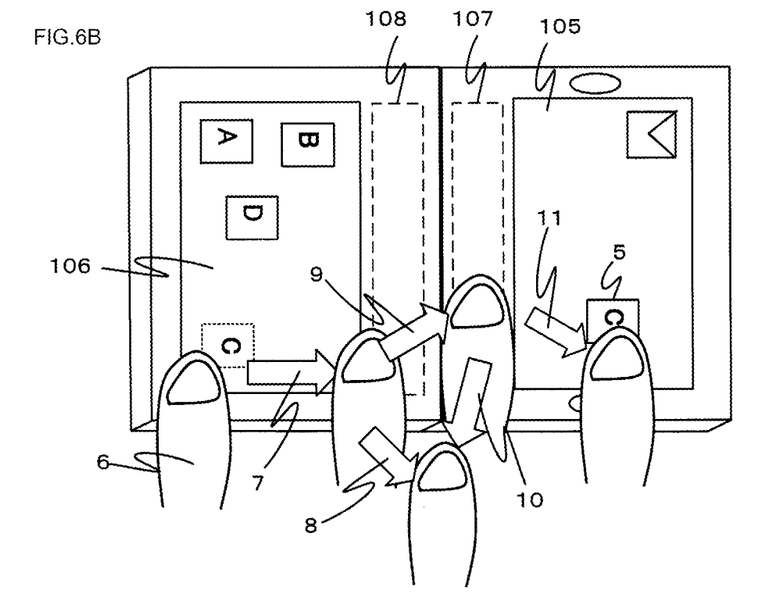

FIG. 5 is an illustration of an exemplary flowchart showing a drag-and-drop control process 500 according to an embodiment of the disclosure. FIGS. 6A-6B are illustrations of an exemplary transition of a drag-and-drop control process according to an embodiment of the disclosure. Process 600 is described herein in conjunction with FIGS. 6A-6B. The various tasks performed in connection with the process 500 may be performed by software, hardware, firmware, a computer-readable medium having computer executable instructions for performing the process method, or any combination thereof. The process 500 may be recorded in a computer-readable medium such as a semiconductor memory, a magnetic disk, an optical disk, and the like, and can be accessed and executed, for example, by a CPU such as the control module 118 in which the computer-readable medium is stored. Process 500 may include any number of additional or alternative tasks, the tasks shown in FIG. 5 need not be performed in the illustrated order, and process 500 may be incorporated into a more comprehensive procedure or process having additional functionality not described in detail herein. For illustrative purposes, the following description of process 500 may refer to elements mentioned above in connection with FIGS. 1-4. In practical embodiments, portions of process 500 may be performed by different elements of the cell phone 100 for example the open/closed detection module 112, the touch panel 105, the touch panel 106, the touch sensor 107, the touch sensor 108, the storage module 111, and the control module 118, etc. The process 500 may have functions, material, and structures that are similar to the embodiments shown in FIGS. 1-4. Therefore common features, functions, and elements may not be redundantly described here.

First, the cell phone 100 displays icons on each of the display modules 114 and 116 (task S1). Then, each of the input modules 115 and 117 detects instances of touch by the user (task S2). If each of the input modules 115 and 117 detects a touch by the user ("Yes" branch of inquiry task S2), the modules 115 and 117 output the coordinate value of a position where the touch is detected (touch position) to the control module 118. The control module 118 then identifies the icon at the touch position where the touch is detected based on the coordinate values output from each of the input modules 115 and 117 (task S3). However, if no touch by the user is detected ("No" branch of inquiry task S2), input modules 115 and 117 repeat detection of instances of touch by the user.

In the embodiment shown in FIG. 6A, for example, the control module 118 displays the icon 1 on the touch panel 105 and the icons 2 to 5 on the touch panel 106. The control module 118 is then considered to have identified the icon 5 based on the coordinate values output by the input module 117 in case the user's finger has touched the touch panel 106.

Next, the operational-state detection module 119 detects whether the touch panel 106 has transitioned to the de-touched state (inquiry task S4). If the de-touched state is detected on the touch panel 106 by the operational-state detection module 119 ("Yes" branch of inquiry task S4), the operation determination module 121 determines whether a touch by the user is detected in the touch sensor 108 by the contact detection module 120 within, for example, a given time period after the de-touched state is detected (inquiry task S5). If the de-touched state is not detected ("No" branch of inquiry task S4), detection of the de-touched state is repeated.

However, if no instance of touch by the user is detected in the touch sensor 108 ("No" branch of task S5), the operation determination module 121 determines that the de-touched state is the current state. The display module 116 displays the icon identified in task S3 at the coordinate values where the de-touching is detected (task S11).

In case a touch by the user is detected in the touch sensor 108 ("Yes" in task S5), the operation determination module 121 continues the touched state (or dragging state). Specifically, as shown in FIG. 6B, for example, In case the user's finger 6 moves in the direction of the arrow 7 while touching the cell phone 100 and thereby enters the area of the touch sensor 108 after leaving the area of the touch panel 106, the operation determination module 121 continues the touched state (or dragging state).

Next, the operation determination module 121 determines whether the touch on the touch sensor 108 is no longer detected by the contact detection module 120 (inquiry task S6). If the touch on the touch sensor 108 is no longer detected ("Yes" branch of task S6), the operation determination module 121 determines whether a touch by the user is detected in the touch sensor 107 within, for example, a given time period after the touch on the touch sensor 108 is no longer detected based on the output from the contact detection module 120 (task S7). On the other hand, in case the touch on the touch sensor 108 is detected ("No" branch of task S6), the operation determination module 121 repeats determination of whether the touch is no longer detected.

In case the touch by the user is not detected by the touch sensor 107 ("No" branch of task S7), the operation determination module 121 determines that the de-touched state is the current state (task S12). In case the de-touched state is determined by the operation determination module 121, the display module 116 displays the icon 5 identified in task S3 in the initial position (coordinate values detected in Task S2) (Task S13). As shown in FIG. 6B, for example, In case the user's finger 6 moves in the direction of the arrow 8 and the user's finger 6 within the area of the touch sensor 108 leaves the touch sensor 108 without moving to the area of the touch sensor 107, the operation determination module 121 determines that the de-touched state is the current state. In this case, the display module 116 displays the icon 5 in the original position (position of the icon 5 in FIG. 6A).

In case the touch by the user is detected by the touch sensor 107 ("Yes" branch of inquiry task S7), the operation determination module 121 continues the touched state (or dragging state). As shown in FIG. 6B, for example, in case the user's finger 6 moves in the direction of the arrow 9 while touching the cell phone 100 and thereby enters the area of the touch sensor 107 after leaving the area of the touch sensor 108, the operation determination module 121 continues the touched state (or dragging state).

Next, the operation determination module 121 determines whether the touch on the touch sensor 107 is no longer detected based on the output from the contact detection module 120 (task S8). When the touch on the touch sensor 107 is no longer detected ("Yes" branch of inquiry task S8), the operation determination module 121 determines whether a touch by the user is detected on the touch panel 105 within, for example, a given time period after the touch on the touch sensor 107 is no longer detected based on the output from the operational-state detection module 119 (inquiry task S9). Otherwise, when the touch on the touch sensor 107 is detected ("No" branch of inquiry task S8), the operation-determination module 121 repeats determination of whether the touch on the touch sensor 107 is no longer detected.

In case the touch by the user is not detected on the touch panel 105 ("No" branch of inquiry task S9), the operation determination module 121 determines that the de-touched state is the current state (task S12). In case the de-touched state is determined to be the current state by the operation determination module 121, the display module 116 displays the icon identified in task S3 in the initial position (coordinate values detected in task S2) (task S13). As shown in FIG. 6B, in case the user's finger 6 moves in the direction of the arrow 10 while touching the cell phone 100 and the user's finger 6 within the area of the touch sensor 107 leaves the touch sensor 107 without moving to the area of the touch panel 105, the operation determination module 121 determines that the de-touched state is the current state. In this case, the display module 116 displays the icon 5 in the original position (position of the icon 5 in FIG. 6A).

In case the touch by the user is detected on the touch panel 105 ("Yes" branch of inquiry task S9), the operation determination module 121 continues the touched state (or dragging state). The display module 114 then displays the icon identified in S3 at the position where the touch by the user is detected on the touch panel 105 (task S10). Specifically, as shown in FIG. 6B, in case the user's finger 6 moves in the direction of the arrow 11 while touching the cell phone 100 and thereby enters the area of the touch panel 105 after leaving the area of the touch sensor 107, the operation determination module 121 continues the touched state (or dragging state). The display module 114 then displays the icon 5 at the touched position detected by the input module 115.

In this manner, the user can perform a drag-and-drop operation as if they are operating on a single display even across two touch panels disposed a module.

Figure 7:
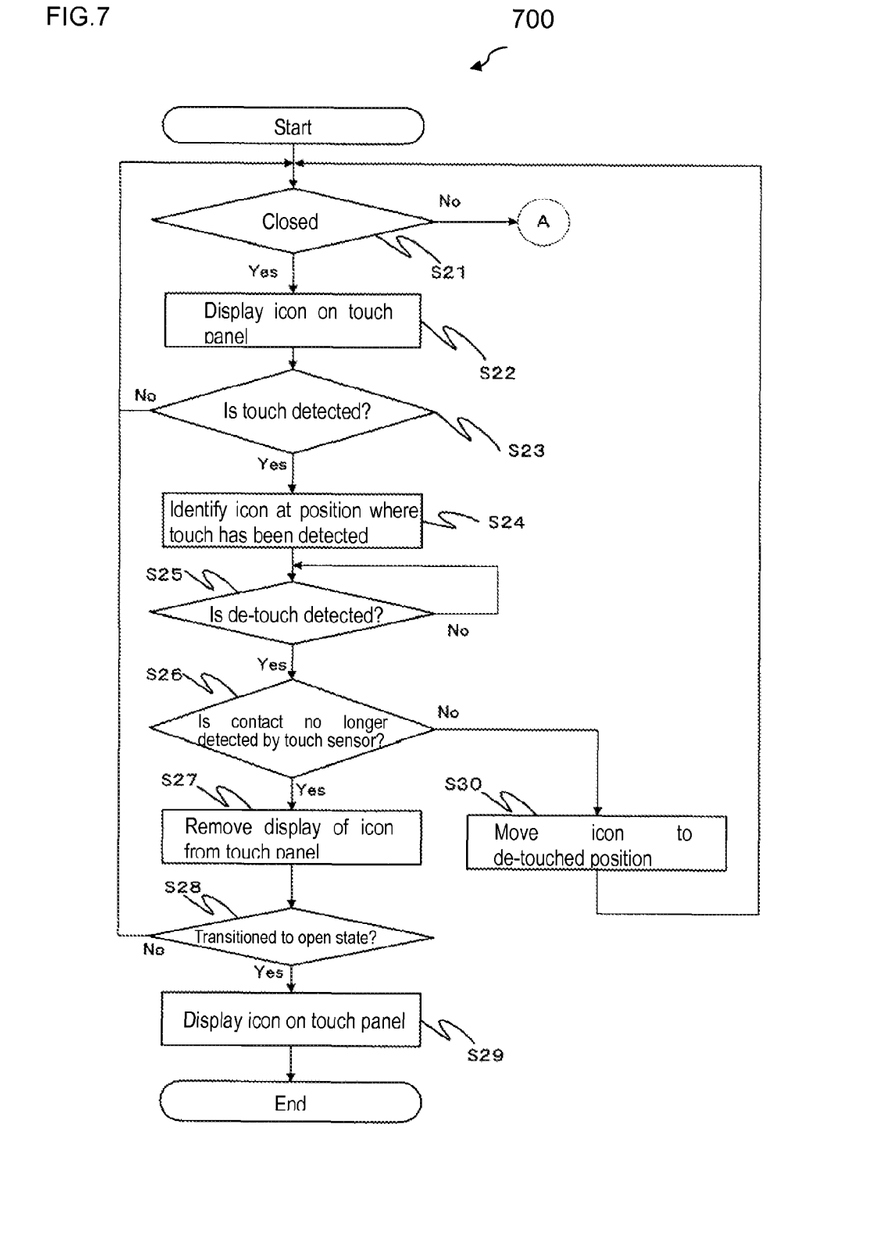
FIG. 7 is an illustration of an exemplary flowchart showing a drag-and-drop control process according to an embodiment of the disclosure.

In the embodiment described in the process 500 an icon displayed on one touch panel may be moved to the other touch panel in case the upper housing 101 and the lower housing 102 are in the open state. In another embodiment as explained below in the context of discussion of process 700, an icon displayed on one touch panel may be moved to the other touch panel in case the upper housing 101 and the lower housing 102 are in the closed state.

Figure 8A:
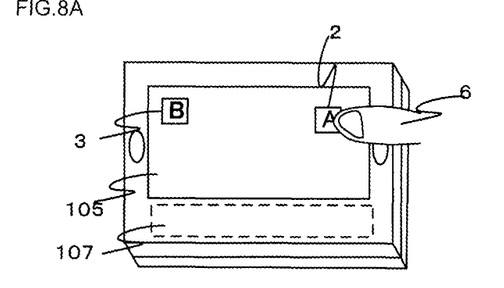
FIGS. 8A-8C are illustrations of an exemplary transition of a control process according to an embodiment of the disclosure.
Figure 8B:
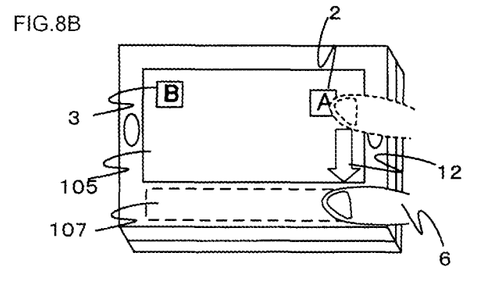
Figure 8C:
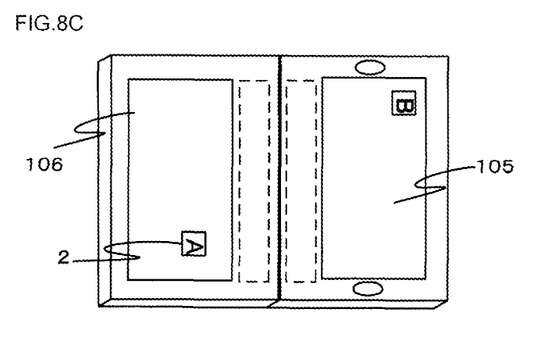

FIG. 7 is an illustration of an exemplary flowchart showing a drag-and-drop control process 700 according to an embodiment of the disclosure. FIGS. 8A-8C are illustrations of an exemplary transition of a control process according to an embodiment of the disclosure. Process 700 is described herein in conjunction with FIGS. 8A-8C. The various tasks performed in connection with the process 700 may be performed by software, hardware, firmware, a computer-readable medium having computer executable instructions for performing the process method, or any combination thereof. The process 700 may be recorded in a computer-readable medium such as a semiconductor memory, a magnetic disk, an optical disk, and the like, and can be accessed and executed, for example, by a CPU such as the control module 118 in which the computer-readable medium is stored. It should be appreciated that process 700 may include any number of additional or alternative tasks, the tasks shown in FIG. 7 need not be performed in the illustrated order, and process 700 may be incorporated into a more comprehensive procedure or process having additional functionality not described in detail herein. For illustrative purposes, the following description of process 700 may refer to elements mentioned above in connection with FIGS. 1-7. In practical embodiments, portions of process 700 may be performed by different elements of the cell phone 100 for example the open/closed detection module 112, the touch panel 105, the touch panel 106, the touch sensor 107, the touch sensor 108, the storage module 111, and the control module 118, etc. The process 700 may have functions, material, and structures that are similar to the embodiments shown in FIGS. 1-7. Therefore common features, functions, and elements may not be redundantly described here.

First, the control module 118 determines whether the upper housing 101 and the lower housing 102 are in the closed state based on the output from the open/closed detection module 112 (inquiry task S21). If the open state is determined to be the current state (i.e., in case the housings are not in the closed state), the control module 118 proceeds to process 500 described above ("No" branch of inquiry task S21). In case the closed state is determined to be the current state ("Yes" branch of inquiry task S21), the control module 118 displays the icon in the display module 114 (task S22). Next, the input module 115 determines whether the user's touch is detected on the touch panel 105 (inquiry task S23), and in case no touch is detected ("No" branch of inquiry task S23), the control module 118 determines whether the upper housing 101 and the lower housing 102 are in the closed state (inquiry task S21). In case a touch is detected ("Yes" branch of inquiry task S23), the coordinates of the position where the touch is detected are output to the control module 118. The control module 118 identifies an icon at a position where the touch is detected based on the coordinate values output from the input modules 115 (task S24).

As shown in FIG. 8A, for example, the control module 118 displays the icon 2 and the icon 3 on the touch panel 105 and then identifies the icon 2 based on the coordinate values output by the input module 115 in case the user's finger has touched the touch panel 105.

Next, the operation determination module 121 determines whether the de-touched state is detected on the touch panel 105 based on the output from the operational-state detection module 119 (task S25). If the de-touched state is not detected on the touch panel 105 ("No" branch of inquiry task S25), the operation determination module 121 repeats the determination, and in case the de-touched state is detected on the touch panel 105 ("Yes" branch of inquiry task S25), the operation determination module 121 determines whether a touch by the user's finger 6 is detected in the touch sensor 107 within a given time period after the de-touched state is detected (task S26). In case no touch by the user's finger 6 is detected in the touch sensor 107 ("No" branch of inquiry task S26), the operation determination module 121 determines that the de-touched state is the current state. In case the de-touched state is determined to be the current state by the operation determination module 121, the display module 114 displays the icon 2 at the position where the de-touch is detected (task S30).

If the touch by the user's finger 6 is detected in the touch sensor 107 within a given time period after the de-touched state is detected ("Yes" branch of inquiry task S26), the operation determination module 121 continues the touch state (or dragging state). As shown in FIG. 8B, for example, in case the user's finger 6 moves in the direction of the arrow 12 while touching the cell phone 100 and thereby enters the area of the touch sensor 107 after leaving the area of the touch panel 105, the touched state is continued.

The display module 114 removes the display of the icon 2 from the touch panel 105 (task S27) after the touch on the touch sensor 107 by the user's finger 6 is no longer detected.

Next, the control module 118 determines whether the upper housing 101 and the lower housing 102 have transitioned to the open state (task S28). If the control module 118 determines that the upper housing 101 and the lower 102 are not transitioned to the open state ("No" branch of inquiry task S28), the control module 118 determines whether the upper housing 101 and the lower housing 102 are in the closed state (task S21), and in case the open state is determined to be the current state ("Yes" branch of task S28), the display module 116 displays the icon 2 at the specified position on the touch panel 106 (task S29). As shown in FIG. 8C, for example, in case the upper housing 101 and the lower housing 102 have transitioned from the closed state to the open state, the display module 116 displays the icon 2 at a specified position on the touch panel 106.

In this manner, an icon displayed on one touch panel can be moved to the other touch panel even if the cell phone 100 is in the closed state.

In one embodiment, the operation determination module 121 is configured to continue the touched state (or dragging state) in case the touch on the touch sensor 107 is detected by the contact detection module 120 within a given time period after the operational-state detection module 119 has detected the de-touched state on the touch panel 105. However, the detection of a touch on the touch sensor 107 by the contact detection module 120 does not necessarily have to be performed within a given time period after the operational-state detection module 119 has detected the de-touched state of the touch panel 105.

Figure 9A:
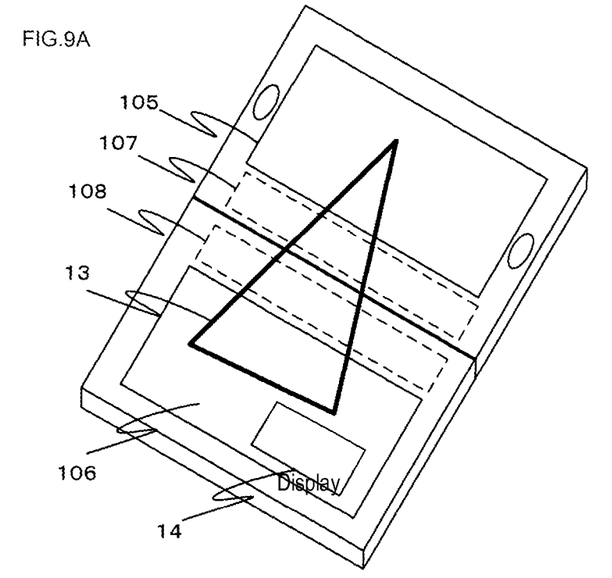
FIGS. 9A-9B are illustrations of an exemplary transition of a control process according to an embodiment of the disclosure.
Figure 9B:
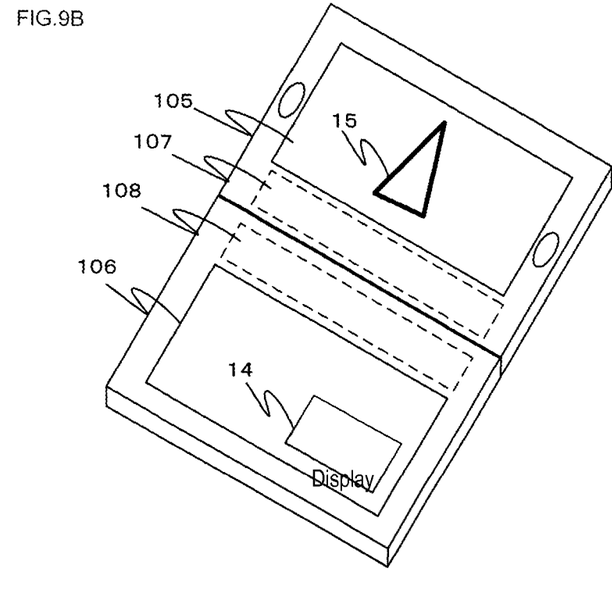

FIGS. 9A-9B are illustrations of an exemplary transition of a control process according to an embodiment of the disclosure. By using the coordinate values output by each input module and each touch sensor during the period of transition from the touched state to the de-touched state, the control module 118 displays a tracing of operations drawn by the user's finger 6 on the touch panel. As shown in FIG. 9A for example, the user's finger 6 draws a tracing 13 (triangular tracing) while touching the cell phone 100. The control module 118 causes the storage module 111 to store the coordinate values output from each input module 115/117 and each touch sensor 107/108 while the user's finger 6 is drawing the tracing 13. After determining that the de-touched state is the current state based on the output from the operational-state detection module 119 and the contact detection module 120, the control module 118 displays—via the icon 14 on the touch panel 105, for example—a tracing 15 produced by scaling down the tracing 13 created based on the stored coordinate values upon receiving instructions from the user to display the tracing. FIG. 9B shows an example in which the display module 114 displays, on the touch panel 105, the tracing 15 that is produced by scaling down the tracing 13 drawn by the user's finger 6.

In the above embodiment, a sliding-type cell phone 100 is described, but the present disclosure is not limited to a sliding-type cell phone. For example, a straight-type cell phone 100 that does not have an opening/closing mechanism may be used. Moreover, the touch sensors located between the two touch panels may be only one of the touch sensor 107 and the touch sensor 108. In addition, in case the present disclosure is implemented in a straight-type cell phone 100 that does not have an opening/closing mechanism, the processes of the inquiry task S6 and the inquiry task S7 in FIG. 7 are not necessary.

In the above embodiment, the operation determination module 121 continues the touched state in case the user's finger 6 moves in the direction of the arrows 9 and 11 in FIG. 5 and FIG. 6, respectively, but the direction is not necessarily limited to the directions of the arrows 9 and 11. For example, the operation determination module 121 may be configured to continue the touched state in case the user's finger 6 moves in the direction opposite to the direction of the arrow 7 instead of the direction of the arrow 9 while being on the touch sensor 108. Moreover, for example, the operation determination module 121 may be configured to continue the touched state even if the user's finger 6 moves in the direction opposite to the direction of the arrow 9 instead of the direction of the arrow 11 while on the touch sensor 107.

As explained above, according to an embodiment, If the operational-state detection module 119 detects the de-touched state, the touched state or dragging state is continued in case there is a touch on either of the touch panels 105 and 106 as well as either of the touch sensors 107 and 108. In another embodiment, the configuration may be one in which, instead of performing processing in case the operational-state detection module 119 has detected the de-touched state, in case a touch is detected by the touch sensor 108 while the dragging state is maintained on the touch panel 106 and, for example, the touch is continued on the touch sensor 108 in case the de-touch is detected on the touch panel 106, the dragging state is continued.

That is, the configuration may be one in which, in case the finger 6 is moving from the touch panel 106 to the touch sensor 108 (e.g., moving in the direction of the arrow 7 in FIG. 6B), if it is detected that the finger 6 is in contact with both the touch panel 106 and the touch sensor 108, the operation determination module 121 continues the dragging state even if the operational-state detection module 119 has detected the de-touched state on the touch panel 106. The same applies in cases in which the finger 6 moves from the touch sensor 108 to the touch sensor 107 as well as cases in which the finger moves from the touch sensor 107 to the touch panel 105.

The condition of "within a given time period" is an example embodiment and does not limit the present disclosure.

In this document, the term "module" as used herein, refers to software, firmware, hardware, and any combination of these elements for performing the associated functions described herein. Additionally, for purpose of discussion, the various modules are described as discrete modules; however, as would be apparent one of skilled in the art, two or more modules may be combined to form a single module that performs the associated functions according the embodiments of the present disclosure.

In this document, the terms "computer program product", "computer-readable medium", and the like may be used generally to refer to media such as, for example, memory, storage devices, or storage unit. These and other forms of computer-readable media may be involved in storing one or more instructions for use by the control module 118 to cause the control module 118 to perform specified operations. Such instructions, generally referred to as "computer program code" or "program code" (which may be grouped in the form of computer programs or other groupings), when executed, enable the display method of the system 100.

While at least one exemplary embodiment is presented in the foregoing detailed description, the present disclosure is not limited to the above-described embodiment or embodiments. Variations may be apparent to those skilled in the art. In carrying out the present disclosure, various modifications, combinations, sub-combinations and alterations may occur in regard to the elements of the above-described embodiment insofar as they are within the technical scope of the present disclosure or the equivalents thereof. The exemplary embodiment or exemplary embodiments are examples, and are not intended to limit the scope, applicability, or configuration of the disclosure in any way. Rather, the foregoing detailed description will provide those skilled in the art with a template for implementing the exemplary embodiment or exemplary embodiments. It should be understood that various changes can be made in the function and arrangement of elements without departing from the scope of the disclosure as set forth in the appended claims and the legal equivalents thereof. Furthermore, although embodiments of the present disclosure have been described with reference to the accompanying drawings, it is to be noted that changes and modifications may be apparent to those skilled in the art. Such changes and modifications are to be understood as being comprised within the scope of the present disclosure as defined by the claims.

Terms and phrases used in this document, and variations hereof, unless otherwise expressly stated, should be construed as open ended as opposed to limiting. As examples of the foregoing: the term "including" should be read as mean "including, without limitation" or the like; the term "example" is used to provide exemplary instances of the item in discussion, not an exhaustive or limiting list thereof; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the present disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent. The term "about" when referring to a numerical value or range is intended to encompass values resulting from experimental error that can occur when taking measurements.

The invention claimed is:

1. A display device comprising:
    a first touch panel;
    a second touch panel;
    a contact detection module located between the first touch panel and the second touch panel;
    a control module operable to perform display control of at least one of the first touch panel and second touch panel, the display control based on operations of at least one of the first touch panel, the second touch panel, and the contact detection module;
    a first housing comprising the first touch panel;
    a second housing comprising the second touch panel and the contact detection module,
    wherein the first housing and the second housing are operable to transition between a closed state in which the second housing is located at a position covering the first touch panel, and an open state in which the first touch panel and the second touch panel are both located on a substantially similar plane, and
    the control module is further operable to:
    determine whether a contact is detected by the contact detection module, if the first housing and the second housing are in the closed state in case a pressure is applied at a position of a displayed object on the second touch panel and the pressure in then released;
    without contact with the first touch panel, display the displayed object from the second touch panel to the first touch panel, if the contact is detected by the contact detection module and if the first housing and the second housing transition from the closed state to the open state.

2. The display device according to claim 1, wherein the control module is further operable to determine if a contact is detected on the contact detection module, if a first pressure is applied at a first position of a displayed object on the first touch panel and then released from the first touch panel.

3. The display device according to claim 2, wherein the control module is further operable to:
    determine if a second pressure is applied to the second touch panel, if the contact detection module detects the contact and then does not detect the contact;
    display the displayed object at a second position of the second pressure on the second touch panel, if the second pressure is applied to the second touch panel.

4. The display device according to claim 2, wherein the control module is further operable to:
    determine if a second pressure is applied to the second touch panel, if the contact detection module detects the contact and then does not detect the contact;
    display the displayed object at the first position on the first touch panel, if the second pressure is not applied on the second touch panel.

5. The display device according to claim 2, wherein the control module is further operable to display the displayed object at a third position where the first pressure on the first touch panel is released, if it is determined that the contact is not detected by the contact detection module.

6. The display device according to claim 1, further comprising a storage module operable to store changes in a position of the operations during a period starting from the operations on at least one of the first touch panel, the second touch panel, and the contact detection module, until the operations are released.

7. The display device according to claim 6, wherein the control module is further operable to display a tracing of the touch operations on at least one of the first touch panel and the second touch panel based on the changes in the position of the touch operations.

8. The display device according to claim 1, wherein the contact detection module comprises a first contact detection module and a second contact detection module and is operable to detect a contact based on a first contact on the first contact detection module and a second contact on the second contact detection module.

9. A display method for a display device including a first housing comprising the first touch panel, a second housing comprising the second touch panel and a contact detection module, the first housing and the second housing operable to transition between a closed state in which the second housing is located at a position covering the first touch panel, and an open state in which the first touch panel and the second touch panel are both located on a substantially similar plane, and a control module operable to determine whether a contact is detected by the contact detection module, if the first housing and the second housing are in the closed state in case a pressure is applied at a position of a displayed object on the second touch panel and the pressure in then released, comprising:
    detecting operations on a first touch panel, a second touch panel, and contact detection module located between the first touch panel and the second touch panel; and
    performing display control for at least one of the first touch panel and second touch panel to position a displayed object, based on the operations;
    transitioning the first housing and the second housing from the closed state to the open state;
    without contact with the first touch panel, displaying the displayed object from the second touch panel to the first touch panel, if the contact is detected by the contact detection module and if the first housing and the second housing is transition from the closed state to the open state.

10. A non-transitory computer readable medium comprising program code for displaying an object on touch panels, a first housing comprising the first touch panel, a second housing comprising the second touch panel and a contact detection module, the first housing and the second housing operable to transition between a closed state in which the second housing is located at a position covering the first touch panel, and an open state in which the first touch panel and the second touch panel are both located on a substantially similar plane, and a control module operable to determine whether a contact is detected by the contact detection module, if the first housing and the second housing are in the closed state in case a pressure is applied at a position of a displayed object on the second touch panel and the pressure in then released;
    the program code for:

detecting operations on a first touch panel, a second touch panel, and contact detection module located between the first touch panel and the second touch panel; and performing display control for at least one of the first touch panel and second touch panel to position a displayed object, based on the operations;

transitioning the first housing and the second housing from the closed state to the open state;

without contact with the first touch panel, displaying the displayed object from the second touch panel to the first touch panel, if the contact is detected by the contact detection module and if the first housing and the second housing transition from the closed state to the open state.

* * * * *